(12) United States Patent
Kakiuchi et al.

(10) Patent No.: US 7,924,696 B2
(45) Date of Patent: Apr. 12, 2011

(54) OPTICAL RECORDING MEDIUM

(75) Inventors: Hironori Kakiuchi, Kobe (JP); Hideo Fujii, Kobe (JP); Norihiro Jiko, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 335 days.

(21) Appl. No.: 12/270,313

(22) Filed: Nov. 13, 2008

(65) Prior Publication Data
US 2009/0154331 A1    Jun. 18, 2009

(30) Foreign Application Priority Data
Dec. 18, 2007 (JP) .................. 2007-325479

(51) Int. Cl.
G11B 7/24 (2006.01)
(52) U.S. Cl. ...................................... 369/275.4
(58) Field of Classification Search .... 369/275.1–275.5, 369/276, 277, 279, 283, 284, 286, 288, 280, 369/44.26; 428/64.4
See application file for complete search history.

(56) References Cited

U.S. PATENT DOCUMENTS

| | | | |
|---|---|---|---|
| 5,448,551 A * | 9/1995 | Miyagawa et al. ........ | 369/275.1 |
| 5,581,539 A * | 12/1996 | Horie et al. ............... | 369/275.4 |
| 6,018,510 A | 1/2000 | Abe et al. | |
| 7,672,215 B2 * | 3/2010 | Noda et al. ................ | 369/275.4 |
| 2004/0241376 A1 | 12/2004 | Chen et al. | |
| 2007/0048488 A1 | 3/2007 | Fujii et al. | |
| 2007/0248783 A1 | 10/2007 | Kakiuchi et al. | |

FOREIGN PATENT DOCUMENTS

| | | |
|---|---|---|
| JP | 7-85503 | 3/1995 |
| JP | 2002-225433 | 8/2002 |
| JP | 2007-230207 | 9/2007 |
| JP | 2007-301761 | 11/2007 |
| JP | 2007-334983 | 12/2007 |
| JP | 2008-41190 | 2/2008 |

OTHER PUBLICATIONS

U.S. Appl. No. 12/376,484, filed Feb. 5, 2009, Fujii et al.
U.S. Appl. No. 12/090,569, filed Apr. 17, 2008, Hideo Fujii et al.
U.S. Appl. No. 12/160,312, filed Jul. 9, 2008, Tatewaki Ido et al.
U.S. Appl. No. 12/168,474, filed Jul. 7, 2008, Hideo Fujii et al.

* cited by examiner

*Primary Examiner* — Ali Neyzari
(74) *Attorney, Agent, or Firm* — Oblon, Spivak, McClelland, Maier & Neustadt, L.L.P.

(57) ABSTRACT

An optical recording medium of a pitting recording type, to which recording marks are formed by irradiation with a violet laser beam having a wavelength λ in the range of about 380 to about 450 nm, includes a substrate having a surface provided with guide grooves and lands, and a metal recording layer in which recording marks are formed by irradiation with a laser beam. The guide grooves and the lands meet conditions expressed by:

$$\lambda/18 \leq D_G \leq \lambda/11 \quad (1)$$

$$1.5 \leq W_G/W_L \leq 3.5 \quad (2)$$

Where λ is the wavelength of the laser beam used for writing and reading, $D_G$, is the depth of the grooves, $W_G$ is the width of the grooves, and $W_L$ is the width of lands formed on the substrate, and the wavelength λ is in the range of 380 to 450 nm.

2 Claims, 2 Drawing Sheets

OPTICAL RECORDING MEDIUM

BACKGROUND OF THE INVENTION

1. Field of the Invention

The present invention relates to an optical recording medium of a pitting recording type provided with metal recording layer in which recording marks are formed by irradiation with a violet laser beam of a wavelength in the range of about 380 to about 450 nm. The optical recording medium of the present invention is an optical recording medium of the next generation, such as a BD (blu-ray disk). More particularly, the present invention relates to a write-once read-many optical recording medium, such as a BD-R.

2. Description of the Related Art

Optical recording mediums, namely, optical disks, are classified roughly by read-write system into read-only optical recording mediums, rewritable optical recording mediums and write-once read-many optical recording mediums. The write-once read-many optical disk records data by using the change of the physical property of a recording film that occurs when the recording film is irradiated with a laser beam. The write-once read-many optical disk permits writing information thereto and inhibits erasing recorded information and rewriting. Write-once read-many optical disks, such as CD-Rs, DVD-Rs and DVD+Rs, having such a characteristic are used for preserving document and image files having data that should be protected from dishonest alteration.

Techniques using a short-wavelength laser beam, such as a violet laser beam, for writing and reading optical information have been developed in recent years to achieve high-density recording. Most write-once read-many optical disks to which information is written with a violet laser beam are provided with a recording layer of a thin film of an inorganic material instead of an organic coloring material. Although recording layers of organic coloring matters have been practically applied to conventional optical disks, such as CD-Rs and DVD-Rs, to which information is written with a read laser beam, recording layers of organic coloring matters are inferior in light resistance because those recording layers react comparatively sensitively to violet laser bean. Therefore, recording layers of organic coloring matters have problems in stably preserving recorded signals for a long time.

Recording methods using a laser beam are roughly classified into phase-change recording methods that change the phase of a recording layer, interlayer reaction recording methods that cause plural recording layers interact, and pitting recording methods that form local recording marks. The phase-change recording method needs a reflecting layer and a dielectric layer in addition to a recording layer to enhance the reflectivity and modulation factor of the optical disk. The inter layer reaction method needs plural recording layers. Thus, the phase-change recording method and the interlayer reaction method need an increased number of layers.

The pitting recording method is applicable to an optical disk having a small number of layers because the recording layer of the optical disk has a high reflectivity and can achieve a high modulation factor. Such an optical disk is advantageous in cost and productivity. A recording layer to which information is written by the pitting recording method As mentioned in JP-A2002-225433, U.S. Pat. App. No. 2004/0241376, WO2007/046390, and JP-A 2007-230207, a recording layer to which information is written by the pitting recording method is made of a metal having a low melting point containing Sn or In as a principal component. For example, a recording layer proposed in JP-A2002-225433 contains Sn as a principal component and at least one of elements in groups 3B, 4B and 5B. A recording layer proposed in U.S. Pat. App. No. 2004/0241376 is made of $A_{(1-y)}M_y$, where A is Si or Sn, M is Al or such, y is between 0.02 and 0.8. The applicant of the present invention proposed in WO2007/046390 a recording layer A of a Sn-base alloy containing at least one of Nd, Gd and La, a recording layer B of an Sn-base alloy containing B and may contain at least one of In, Y, La, Nd and Gd, a recording layer C of a Sn-base alloy containing In and/or Co, and at least one of In, Bi and Zn and may contain a rare earth element, a recording layer D of a Sn-base alloy containing a rare earth element and may contain In and/or Bi, and a recording layer E of a Sn-base alloy containing elements in groups 4a, 5a, 6a and 7a and at least one of Pt, Dy, Sm and Ce and may contain Nd an/or Y. The applicant of the present invention proposed in JP-A 2007-230207 a recording layer of an In-base alloy containing a rare earth element, Pd, Co, Pt, V, Ni and Au.

An optical disk of basic construction has a transparent substrate called a base and having a surface provided with concentric circular grooves or spiral grooves called tracks, a recording layer formed on the surface of the substrate, and a cover layer, namely, an optically transparent layer, formed on the recording layer. A laser beam is focused on flat parts of the grooves or lands forming the tracks to write information to or to read information from the optical disk.

FIG. 1 is an enlarged, fragmentary perspective view of an optical disk, which corresponds to FIG. 5 in JP-A H10-334512. As shown in FIG. 1, guide grooves 4 are formed in a substrate 7 to guide accurately a spot 3 of a laser beam (not shown) projected from below the substrate 7 to desired positions. The reflectivity of parts of a recording layer 1 irradiated with the laser beam changes to form recording marks 2. Each of lands 5 is formed between the adjacent guide grooves 4.

Tracking control is performed to make a read-write light beam follow the guide groove. Tracking errors are detected by a push-pull method. Referring to FIG. 2, the push-pull method focuses light reflected from an optical disk on right and left optical detectors separated by a space parallel to the groove and detects the difference between light intensities detected by the right and the left optical detector as a tracking error (tracking signal). The tracking signal is zero when the spot of the read-write light beam is on the groove or the land and is positive or negative when the beam of the read-write light beam is between the groove and the land due to the phase difference between the light reflected from the groove and the light reflected from the land. The thus measured values are used for the feedback control of the position of the spot of the light beam to eliminate tracking error.

Generally, the phase-change optical disk has a low reflectivity and a low modulation factor. Therefore, satisfactory tracking signals cannot be obtained by the push-pull method and stable tracking control cannot be achieved. Methods capable of achieving tracking control by the push-pull method by properly controlling the width or depth of the grooves are proposed in JP-A H7-85503 and JPA H10-334512.

Problems similar to those in the phase-change optical disk reside also in pitting recording optical disks.

SUMMARY OF THE INVENTION

Accordingly, it is an object of the present invention to provide an optical recording medium of a pitting recording type, such as a write-once read-many optical disk, in which recording marks are formed by irradiation with a violet laser beam of a wavelength in the range of abut 380 to about 450 nm, and capable of ensuring stable tracking control.

The present invention provides an optical recording medium including a substrate having a surface provided with guide grooves and lands, and a metal recording layer in which recording marks are formed by irradiation with a laser beam, wherein the guide grooves and the lands meet conditions expressed by:

$$\lambda/18 \leq D_G \leq \lambda/11 \quad (1)$$

$$1.5 \leq W_G/W_L \leq 3.5 \quad (2)$$

Where $\lambda$ is the wavelength of the laser beam used for writing and reading, $D_G$ is the depth of the grooves, $W_G$ is the width of the grooves, and $W_L$ is the width of lands formed on the substrate, and the wavelength $\lambda$ is in the range of 380 to 450 nm.

Preferably, the optical recording medium is a write-once read-many recording medium.

The optical recording medium of a pitting recording type of the present invention is provided with the grooves and the lands of dimensions, namely, width and depth, suitable for tracking control. Therefore, stable tracking control can be achieved. The optical recording medium of a pitting recording type, as compared with optical recording mediums of other recording types, needs a small number of layers and is advantageous in cost. The optical recording medium of the present invention is suitable for use as a writ-once read-many optical recording medium to which information is written with a violet laser beam, such as a BD-R to which information is written with a laser beam of 405 nm in wavelength.

BRIEF DESCRIPTION OF THE DRAWINGS

The above and other objects, features and advantages of the present invention will become apparent from the following description taken in connection with the accompanying drawings, in which.

DESCRIPTION OF THE PREFERRED EMBODIMENTS

The present invention relates to techniques for tracking control for the correct alignment of a spot of a violet laser beam of a wavelength in the range of about 380 to about 450 nm with tracks formed in a metal recording layer of an optical recording medium of pitting recording type. The optical recording medium of the present invention is characterized by grooves G having a depth $D_G$ and a width $W_G$, and lands L having a width $W_L$ and optimized to achieve push-pull tracking control satisfactorily. Although many techniques relating to optical recording mediums provided with grooves and lands of selectively determined shapes have been proposed, there has not been proposed an optical recording medium of a pitting recording type provided with a metal recording layer to which information is written with a violet laser beam, and a track structure of dimensions that enable tracking control.

Figure 1:
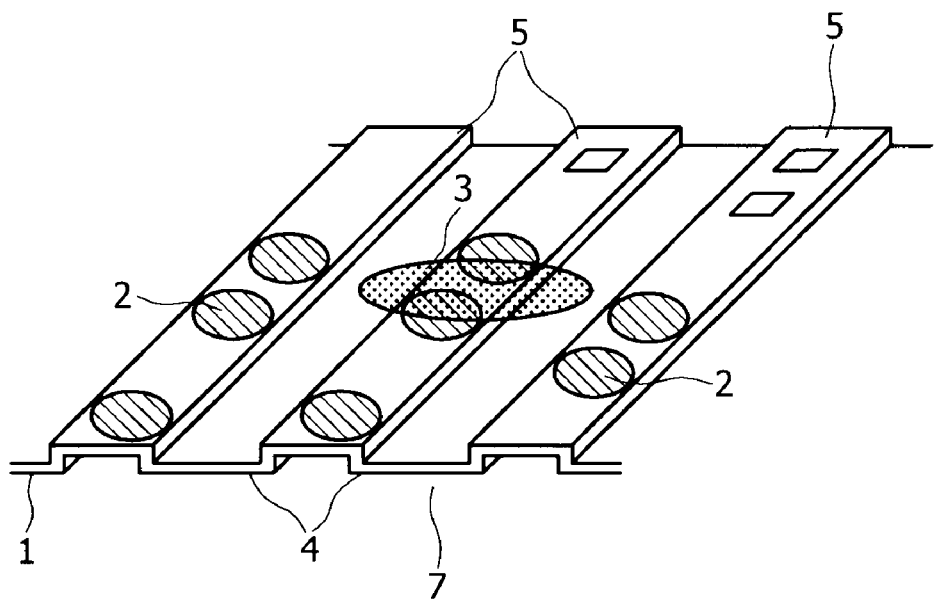
FIG. 1 is an enlarged, fragmentary perspective view of a typical optical recording medium, namely, an optical disk.
Figure 2:
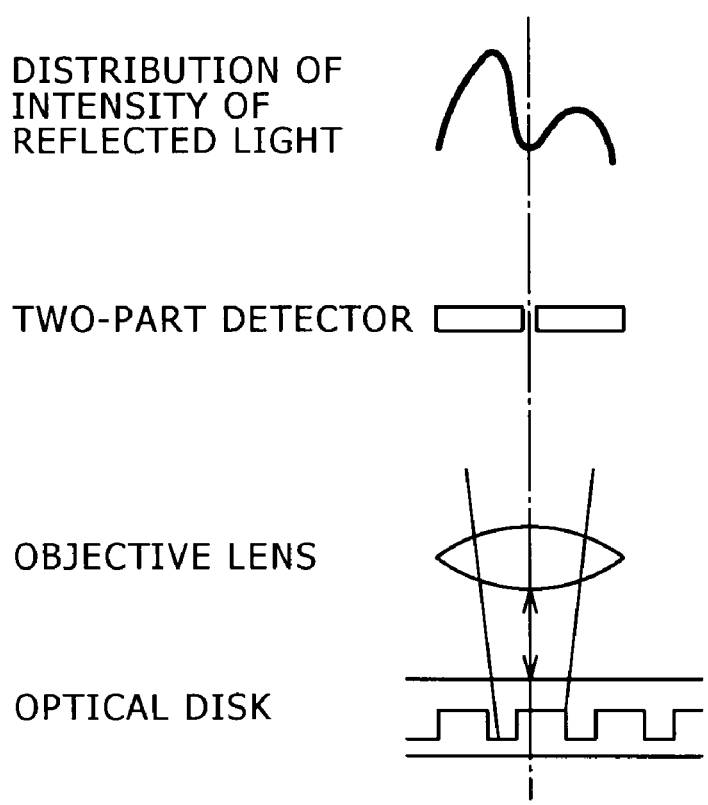
FIG. 2 is a diagrammatic view of assistance in explaining a push-pull method of detecting tracking errors.
Figure 3:
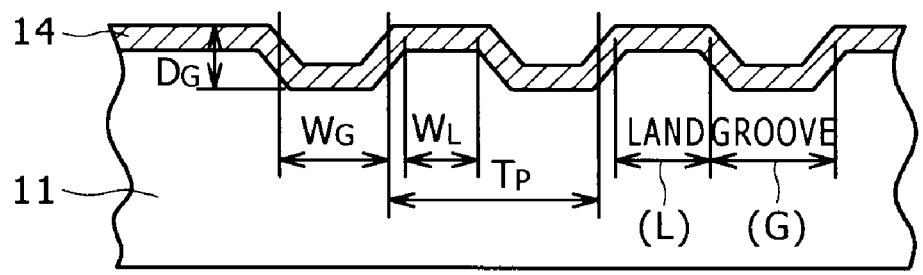
FIG. 3 is a typical sectional view of assistance in explaining the shapes of grooves and lands in an optical recording medium according to the present invention.

An optical recording medium in a preferred embodiment according to the present invention will be described with reference to FIG. 3. The optical recording medium adopts an on-groove recording type in which information is recorded on the land areas, which have convex shapes toward the laser beam incident surface side.

The optical recording medium in this embodiment meets conditions expressed by:

$$\lambda/18 \leq D_G \leq \lambda/11 \quad (1)$$

$$1.5 \leq W_G/W_L \leq 3.5 \quad (2)$$

where $\lambda$ is the wavelength of the laser beam used for writing and reading, $D_G$ is the depth of the grooves, $W_G$, is the width of the grooves, and $W_L$ is the width of lands formed on the substrate. Wavelength $\lambda$ is in the range of 380 to 450 nm.

The depth $D_G$ of the grooves, the width $W_G$ (full width at half maximum) of the grooves, and the width $W_L$ (full width at half maximum) of lands were determined through the observation of an area of 2.5 μm sq. in the surface of the substrate provided with the grooves and the lands under an atomic force microscope (Probe Station SP14000, Seiko Instruments) in the y-mode.

The grooves having the depth $D_G$ and the width $W_G$ and the lands having the width $W_L$ can be formed in the surface of a substrate by a method generally known in the field of optical disks. A substrate provided with grooves and lands can be fabricated by a method including the steps of forming a master disk using, for example, a photoresist, forming a metal stamper by a sputtering process or a plating process using the master disk, and forming a substrate by an injection molding process (transfer process) placing the stamper in a mold and injecting a molding material, such as a polycarbonate resin, into the mold. Conditions for those processes are generally known in this field.

According to the present invention, the depth $D_G$ of the grooves is $\lambda/18$ or above, preferably, $\lambda/16$ or above, and is $\lambda/11$ or below, preferably, $\lambda/12$ or below. The wavelength $\lambda$ of the laser beam for writing and reading is in the range of 380 to 450 nm, preferably, 405 nm (BD standard).

As it will be explained later in connection with examples, the normalized push-pull value of unrecorded parts (hereinafter, referred to as "$PP_{norm}$(unrecorded parts)") is excessively large and satisfactory tracking control is difficult if the depth $D_G$ of the grooves exceeds $\lambda/11$. It is inferred that the $PP_{norm}$(unrecorded parts) becomes excessively large when the depth $D_G$ of the grooves is excessively big and the difference in brightness between the grooves and the lands increases because the difference between an optical path length to the groove and an optical path length to the land increases as the depth $D_G$ of the grooves increases. On the other hand, push-pull tracking control is difficult if the $PP_{norm}$ (unrecorded parts) is excessively small because the difference in brightness between the grooves and the lands is excessively small.

According to the present invention, the $W_G/W_L$ ratio is 1.5 or above, preferably, 1.7 or above, and 3.5 or below, preferably, 3.0 or below. As it will be explained later in connection with examples, normalized push-pull value varies widely during mark recording and a reference $\{PP_{norm}(\text{recorded parts})\}/\{PP_{norm}(\text{unrecorded parts})\}$ ratio cannot be satisfied if the $W_G/W_L$ ratio is below 1.5. Consequently, satisfactory tracking control cannot be achieved. It is inferred that the influence of the area of recording marks augments with the decrease of the width $W_G$ of the grooves because the area of the grooves contributing to tracking control decreases as the $W_G$ decreases, while the area of recording marks formed in the grooves is fixed.

Standard pitches of tracks on a BD equal to $W_G+W_L$ are predetermined. Excessive decrease of the area of lands resulting from an excessively high $W_G/W_L$ ratio affects adversely to pattern transference in forming the substrate by an injection molding process or the like. Thus, the present invention determines that the $W_G/W_L$ ratio is 3.5 or below, preferably, 3.0 or below.

The present invention includes all the optical recording mediums of a pitting recording type provided with grooves and lands having shapes meeting the foregoing requisite conditions. There are not any particular restrictions on the construction of the optical recording medium and the optical recording medium of the present invention may have any one of known types of construction mentioned in, for example, in the foregoing reference documents.

Figure 4:
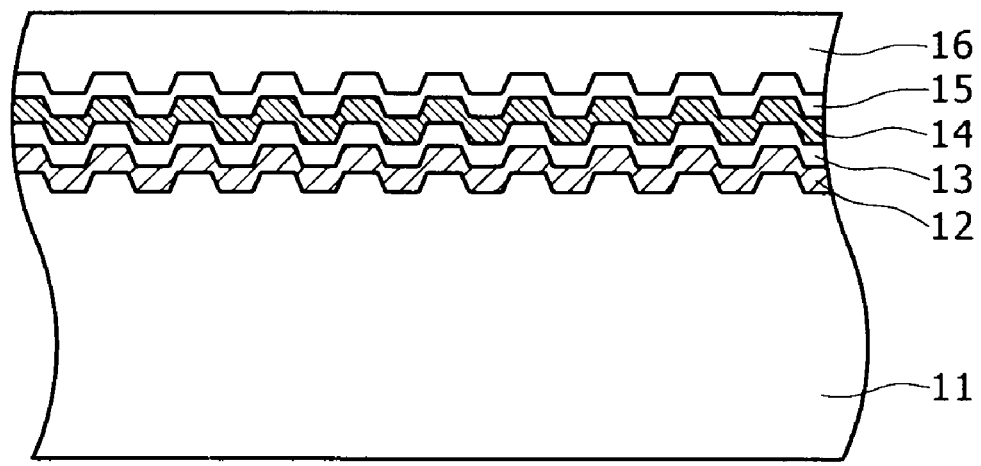
FIG. 4 is a typical sectional view of an optical recording medium in a preferred embodiment according to the present invention.

FIG. 4 is a typical sectional view of an optical recording medium in a preferred embodiment according to the present invention. The optical recording medium shown in FIG. 4 is a write-once read many optical disk 10 to which data can be written and from which data can be read using a violet laser beam of a wavelength in the range of about 380 to about 450 nm, preferably, 405 nm. The write-once read-many optical disk 10 includes a substrate 11, an optical control layer 12, dielectric layers 13 and 15, a recording layer 14 sandwiched between the dielectric layers 13 and 15, and an optically transparent layer 16. The dielectric layers 13 and 15 are protective layers for protecting the recording layer 14 so that recorded information can be preserved for a long time.

Preferably, the substrate 11 is made of, for example, a polycarbonate resin, a norbornane resin, a cyclic olefin copolymer or an amorphous polyolefin resin. A polycarbonate resin the most desirable material.

There are not particular restrictions on the materials of the optical control layer 12 and the dielectric layers 13 and 15 and any suitable ones of generally used materials may be used for forming the optical control layer 12 and the dielectric layers 13 and 15. Suitable materials for forming the dielectric layers 13 and 15 are metal sulfides, metal oxides and metal carbides including ZnS, $SiO_2$, SiN, AlN, $Al_2O_3$ and $Ta_2O_5$, metallic selenium compounds and mixtures of some of those materials. When the recording layer of the present invention is used, the dielectric layers 13 and 15 can be omitted.

The recording layer 14 is made of a metal having a low melting point of about 100° C. or below. Representative metals having a low melting point are In-base alloys mentioned in JP-A 2002-225433, U.S. Pat. App. No. 2004/0241376 and WO2007/046390 and Sn-base alloys mentioned in JP-A2007-230207. For example, the In-base alloys are those respectively containing alloying elements including Co, Ni and Sn, and the Sn-base alloys are those respectively containing alloying elements including Ni and Y. The respective compositions of those In-base alloys and the Sn-base alloys are mentioned in the foregoing patent documents. The recording layer of the metal having a low melting point can be formed on the substrate by a film forming process generally known in the relevant field, such as a sputtering process.

Preferably, the thickness of the recording layer 14 is 1 nm or above, desirably, 2 nm or above, and 50 nm or below, desirably, 30 nm or below. Defects, such as pores, are liable to be formed in the surface of the recording layer 14 and it is difficult to achieve satisfactory recording sensitivity if the recording layer 14 is excessively thin. Heat given to the recording layer 14 by irradiation with a laser beam tends to diffuse rapidly in the recording layer 14 and it is difficult to form recording marks if the recording layer 14 is excessively thick.

EXAMPLES

Examples of the present invention will be described. The following examples are not limitative and changes can be made therein without departing from the scope of the foregoing and the following gist of the present invention, and modifications of the following examples are within the scope of the present invention.

Example 1

Examples simulating an optical recording medium were fabricated by the following method and the push-pull characteristics thereof were evaluated.

(1) Fabrication of Examples

Polycarbonate resin substrates of 1.1 mm in thickness provided with grooves and lands of dimensions shown in Table 1 were used. All the substrates had the same track pitch ($=W_G+W_L$) of 0.32 μm (BD standard). The substrates were provided with grooves of different widths $W_G$ and lands of different widths $W_L=0.32-W_G$, respectively. The grooves of the substrates were formed in different depths $D_G$ of about 25 nm ($=\lambda/16$) about 30 nm ($=\lambda/14$), about 35 nm ($=\lambda/12$, and abut 40 nm ($=\lambda/10$), respectively. The wavelength λ was 405 nm.

A recording layer was formed on the substrates by a dc magnetron sputtering process using a composite target prepared by putting five Co chips of 10 mm sq., namely, chips of an additive element, on an In target of 4 in. in diameter. A process vacuum was $3\times10^{-6}$ Torr or below, Ar gas pressure was 3 mTorr and dc sputtering power was 100 W. A recording layer of 12 nm in thickness was formed in a deposition time in the range of 2 to 5 min. The composition of the recording layer was analyzed by ICP mass spectrometry. The recording layer had a composition of In-40% Co (atomic percent).

The recording film was coated with a UV-curing resin film of a UV-curing resin (BRD-130, Nippon Kayaku Co., Ltd.) by a spin coating method and the UV-curing resin film was irradiated with ultraviolet radiation to form an optically transparent film having a thickness of 100±15 μm, namely, a covering layer.

(2) Measurement of Push-Pull Characteristic

An optical disk testing apparatus (ODU-1000, Pulstec Industrial Co., Ltd.) was used. Tests formed a recording mark of 0.6 μm in length, which corresponds to an 8T signal for a BD of 25 GB in recording capacity, repeatedly by using a recording laser beam having a wavelength of 405 nm and a NA (numerical aperture) of 0.85, a linear speed of 4.9 m/s and recording laser power of 7 mW. In the examples, recording marks were formed by an on-groove recording method that forms recording marks on the surfaces of the grooves.

The $PP_{norm}$(recorded part) of the recorded parts and the $PP_{norm}$(unrecorded part) of unrecorded parts were measured by using a read-write laser beam having a wavelength of 405 nm (BD standard) and reproducing laser power of 3 mW. $PP_{norm}$ is used for tracking control by a push-pull method. $PP_{norm}$ is calculated by using:

$$PP_{norm}=\{(I_1-I_2)/(I_1+I_2)\}_{at\ t2}-\{(I_1-I_2)/(I_1-I_2)\}_{at\ t1} \quad (3)$$

where $I_1+I_2$ is the sum of light intensities measured by the right and the left detector, $(I_1-I_2)$ is the difference between light intensities measured by the right and the left detector, $t_1$ is time when $(I_1-I_2)$ is a minimum, and $t_1$ is time when $(I_1-I_2)$ is a maximum.

(3) Criteria for Evaluating Push-Pull Characteristic

The examples were evaluated on the basis of BD standards. Examples meeting all the following criteria (a), (b) and (c) are excellent in tracking controllability and are acceptable.

Criterion (a): $0.21 \leq PP_{norm}$(recorded part)$\leq 0.45$
Criterion (b): $0.21 \leq PP_{norm}$(unrecorded part)$\leq 0.45$
Criterion: (c): $0.75$ $PP_{norm}$(recorded part)/$PP_{norm}$(unrecorded part)$\leq 1.25$ Criteria (a), (b) and (c) will be described. Generally, tracking control is difficult when the optical recording medium has a push-pull characteristic represented by an excessively low $PP_{norm}$. An excessively large $PP_{norm}$ affects adversely to recording and reproducing characteristics. Therefore, the $PP_{norm}$(recorded part) and the $PP_{norm}$(unrecorded part) need to meet the criteria (a) and (b), respectively.

Tracking control is difficult when tracks are changed from a recording part to an unrecorded part if the difference between $PP_{norm}$(recorded part) and $PP_{norm}$(unrecorded part) is large. Therefore, the ratio of $PP_{norm}$(recorded part) to $PP_{norm}$(unrecorded part) needs to be within a fixed range as specified by the criterion (c).

Measured values of $PP_{norm}$(recorded part) and $PP_{norm}$(unrecorded part) are shown in Tables 2 and 3, respectively. Values of the ratio of $PP_{norm}$(recorded part) to the $PP_{norm}$(unrecorded part) calculated by using values shown in Tables 2 and 3 are shown in Table 4. In Table 5, values meeting the criteria (a), (b) and (c) are marked with a blank circle and those not meeting the criteria (a), (b) and (c) are marked with a cross.

TABLE 2

| $D_G$ | $W_G/W_L$ | | | | | |
|---|---|---|---|---|---|---|
| | 0.8 | 1.0 | 1.3 | 1.7 | 2.2 | 3.0 |
| $\lambda/16$ | 0.19 | 0.26 | 0.24 | 0.27 | 0.29 | 0.31 |
| $\lambda/14$ | 0.28 | 0.33 | 0.30 | 0.33 | 0.33 | 0.35 |
| $\lambda/12$ | 0.36 | 0.38 | 0.37 | 0.38 | 0.37 | 0.36 |
| $\lambda/10$ | 0.45 | 0.43 | 0.44 | 0.43 | 0.42 | 0.44 |

$0.21 \leq PP_{norm}$(recorded part) $\leq 0.45$ ... (a)

TABLE 3

| $D_G$ | $W_G/W_L$ | | | | | |
|---|---|---|---|---|---|---|
| | 0.8 | 1.0 | 1.3 | 1.7 | 2.2 | 3.0 |
| $\lambda/16$ | 0.32 | 0.35 | 0.33 | 0.34 | 0.35 | 0.36 |
| $\lambda/14$ | 0.42 | 0.46 | 0.41 | 0.38 | 0.37 | 0.38 |
| $\lambda/12$ | 0.53 | 0.55 | 0.48 | 0.42 | 0.40 | 0.39 |
| $\lambda/10$ | 0.65 | 0.61 | 0.55 | 0.47 | 0.46 | 0.47 |

$0.21 \leq PP_{norm}$(unrecorded part) $\leq 0.45$ ... (b)

TABLE 4

| $D_G$ | $W_G/W_L$ | | | | | |
|---|---|---|---|---|---|---|
| | 0.8 | 1.0 | 1.3 | 1.7 | 2.2 | 3.0 |
| $\lambda/16$ | 0.59 | 0.74 | 0.73 | 0.79 | 0.83 | 0.86 |
| $\lambda/14$ | 0.67 | 0.72 | 0.73 | 0.87 | 0.89 | 0.92 |
| $\lambda/12$ | 0.68 | 0.69 | 0.77 | 0.90 | 0.93 | 0.92 |
| $\lambda/10$ | 0.69 | 0.70 | 0.80 | 0.91 | 0.91 | 0.94 |

$0.75$ $PP_{norm}$(recorded part)/$PP_{norm}$(unrecorded part) $\leq 1.25$ ... (c)

TABLE 5

| $D_G$ | | $W_G/W_L$ | | | | | | | | | | | |
|---|---|---|---|---|---|---|---|---|---|---|---|---|---|
| | | 0.8 | | 1.0 | | 1.3 | | 1.7 | | 2.2 | | 3.0 | |
| $\lambda/16$ | Criterion (a) | X | Criterion (a) | ○ | Criterion (a) | ○ | Criterion (a) | ○ | Criterion (a) | ○ | Criterion (a) | ○ |
| | Criterion (b) | ○ | Criterion (b) | ○ | Criterion (b) | ○ | Criterion (b) | ○ | Criterion (b) | ○ | Criterion (b) | ○ |
| | Criterion (c) | X | Criterion (c) | X | Criterion (c) | X | Criterion (c) | X | Criterion (c) | ○ | Criterion (c) | ○ |
| $\lambda/14$ | Criterion (a) | ○ | Criterion (a) | ○ | Criterion (a) | ○ | Criterion (a) | ○ | Criterion (a) | ○ | Criterion (a) | ○ |
| | Criterion (b) | ○ | Criterion (b) | X | Criterion (b) | ○ | Criterion (b) | ○ | Criterion (b) | ○ | Criterion (b) | ○ |
| | Criterion (c) | X | Criterion (c) | X | Criterion (c) | X | Criterion (c) | ○ | Criterion (c) | ○ | Criterion (c) | ○ |
| $\lambda/12$ | Criterion (a) | ○ | Criterion (a) | ○ | Criterion (a) | ○ | Criterion (a) | ○ | Criterion (a) | ○ | Criterion (a) | ○ |
| | Criterion (b) | X | Criterion (b) | X | Criterion (b) | X | Criterion (b) | ○ | Criterion (b) | ○ | Criterion (b) | ○ |
| | Criterion (c) | X | Criterion (c) | X | Criterion (c) | ○ | Criterion (c) | ○ | Criterion (c) | ○ | Criterion (c) | ○ |
| $\lambda/10$ | Criterion (a) | ○ | Criterion (a) | ○ | Criterion (a) | ○ | Criterion (a) | ○ | Criterion (a) | ○ | Criterion (a) | ○ |
| | Criterion (b) | X | Criterion (b) | X | Criterion (b) | X | Criterion (b) | X | Criterion (b) | X | Criterion (b) | X |
| | Criterion (c) | X | Criterion (c) | X | Criterion (c) | ○ | Criterion (c) | ○ | Criterion (c) | ○ | Criterion (c) | ○ |

TABLE 1

| Dimensions | $W_G/W_L$ | | | | | |
|---|---|---|---|---|---|---|
| | 0.8 | 1.0 | 1.3 | 1.7 | 2.2 | 3.0 |
| $W_G$ (μm) | 0.14 | 0.16 | 0.18 | 0.20 | 0.22 | 0.24 |
| $W_L$ (μm) | 0.18 | 0.16 | 0.14 | 0.12 | 0.10 | 0.08 |
| Track pitch (μm) (=$W_G+W_L$) | 0.32 | 0.32 | 0.32 | 0.32 | 0.32 | 0.32 |

It is known from the foregoing measured values that the optical recording mediums provided with grooves and lands meeting all the requisite conditions of the present invention, namely, $D_G=\lambda/16$ to $\lambda/12$ and $W_G/W_L=1.7$ to $3.0$, have values of $PP_{norm}$(recorded part), $PP_{norm}$(unrecorded part) and $PP_{norm}$(recorded part)/$PP_{norm}$(unrecorded part) meeting the criteria (a), (b) and (c) and can maintain stable tracking control.

When marks are recorded in the optical recording mediums having a value of the ratio $W_G/W_L$ below the lower limit of 1.5, the value of $PP_{norm}$ varies widely and hence $PP_{norm}$(recorded part)/$PP_{norm}$(unrecorded part) does not meet the criterion (c). The optical recording mediums provided with grooves having a groove depth $D_G$ above the upper limit of $\lambda/11$ has an excessively large $PP_{norm}$(unrecorded part) and do not meet the criterion (b).

What is claimed is:

1. An optical recording medium comprising:
   a substrate having a surface provided with guide grooves and lands; and
   a metal recording layer in which recording marks are formed by irradiation with a laser beam;
   wherein the guide grooves and the lands meet conditions expressed by:

$$\lambda/18 \leq D_G \leq \lambda/11 \quad (1)$$

$$1.5 \leq W_G/W_L \leq 3.5 \quad (2)$$

where $\lambda$ is the wavelength of the laser beam used for writing and reading, $D_G$ is the depth of the grooves, $W_G$ is the width of the grooves, and $W_L$ is the width of lands formed on the substrate, and the wavelength $\lambda$ is in the range of 380 to 450 nm.

2. The optical recording medium according to claim 1 is a write-once read-many recording medium.

* * * * *